United States Patent
Gerhold

[11] Patent Number: 5,902,460
[45] Date of Patent: May 11, 1999

[54] MULTI-STAGE FRACTIONAL DISTILLATION PROCESS AND APPARATUS

[76] Inventor: Bruce W. Gerhold, Rte. 3, Box 8190, Bartlesville, Okla. 74003

[21] Appl. No.: 08/717,560

[22] Filed: Sep. 23, 1996

[51] Int. Cl.$^6$ .................. B01D 3/16; B01D 3/32
[52] U.S. Cl. .................. 203/99; 196/111; 202/153; 202/158; 203/DIG. 19
[58] Field of Search .................. 203/99, DIG. 19, 203/DIG. 9; 202/153, 197, 158; 196/110, 111, 125, 139, 100; 208/308, 350; 585/800

[56] References Cited

U.S. PATENT DOCUMENTS

| | | | |
|---|---|---|---|
| 2,471,134 | 5/1949 | Wright | 196/100 |
| 3,053,521 | 9/1962 | Plaster et al. | 202/158 |
| 3,502,547 | 3/1970 | Bridgeford | 203/71 |
| 3,730,690 | 5/1973 | McCarthy et al. | 202/158 |
| 3,959,085 | 5/1976 | De Graff | 202/154 |
| 4,032,410 | 6/1977 | Kuxdorf et al. | 202/158 |
| 4,230,533 | 10/1980 | Giroux | 203/DIG. 19 |
| 4,247,368 | 1/1981 | Bannon et al. | 202/158 |
| 4,543,219 | 9/1985 | Yamato et al. | 261/109 |
| 4,615,770 | 10/1986 | Govind | 203/25 |
| 4,629,534 | 12/1986 | Ezell | 196/111 |
| 5,339,648 | 8/1994 | Lockett et al. | 202/158 |

*Primary Examiner*—Virginia Manoharan
*Attorney, Agent, or Firm*—Ryan N. Cross

[57] ABSTRACT

A distillation column suitable for the separation of a three component feed mixture is provided wherein the fractional distillation column utilizes a vertical partition and a baffle to prevent feed mixture from taking a direct flow path from the feed inlet to the sidedraw exit. The use of the vertical partition increases the separation purity of the middle boiling fraction and lower boiling fraction.

4 Claims, 2 Drawing Sheets

«5,902,460»

MULTI-STAGE FRACTIONAL DISTILLATION PROCESS AND APPARATUS

The present invention relates generally to fractional distillation systems. More particularly, it relates to a multi-stage fractional distillation column for separation of multi-component mixtures.

BACKGROUND OF THE INVENTION

Distillation remains the most widely used method for separating a mixture into its components or separating a few valuable products from a mixture. Distillation involves stripping and rectifying, both typically conducted in the same tower at different heights along the tower. In the lower portion of the tower, below the feed tray, a mixture is heated causing it to boil. The generated vapors pass upwardly through the column. At the feed tray, a feed mixture in liquid form is injected into the column. This liquid flows downwardly, contacting the rising vapors. The vapors preferentially strip the more volatile components of the mixture from the downwardly flowing liquid. Vapors continue to rise upwardly into the upper rectifying portion of the tower and pass completely out of the column. A portion of these vapors are condensed and re-injected at the top into the column near its highest point. This condensed liquid contacts the upwardly flowing vapors causing the less volatile material to condense. The separation occurring in the stripping section is affected by the vaporization of the more volatile components. The separation in the rectifying section is caused by the condensation of less volatile material.

Often it is desired to separate several components from a multi-component mixture feed. To accomplish this, several columns can be aligned in series to remove one pure component or one boiling range from each column. When a feed mixture is to be separated into three components, an alternative to a series of continuously fed distillation units is fractionating one pure cut either in the kettle or overhead and taking a third cut from a side takeoff location. However, with such a multi-component mixture, a column with a side takeoff generally produces only one pure product. Therefore, when it is desired to have two or more high purity products from a fractional distillation system, typically, a series of columns has been used. It would be highly desirable to have a single distillation column capable of producing two or more high purity products.

SUMMARY OF THE INVENTION

It is an object of this invention to provide a fractional distillation column capable of separating a feed mixture into two or more products, each having a higher purity than would be achieved by using a conventional single distillation column with a side takeoff product.

In accordance with this invention, there is provided an apparatus for the separation of different boiling point fractions from a feed mixture containing a middle boiling fraction, a higher boiling fraction and a lower boiling fraction. The apparatus comprises a fractional distillation column having a bottom section, a top section and a middle section and having a first outlet for removing primarily the higher boiling fraction located in the bottom section, a second outlet for removing primarily the middle boiling fraction located in the middle section, a third outlet for removing primarily the lower boiling fraction located in the top section and a feed inlet for introducing the feed mixture into the fractional distillation column located below the second outlet and within the middle section. The fractional distillation column further contains a partition extending vertically from the top of the middle section to the bottom of the middle section and having an upper end and a lower end.

In accordance with another aspect of the invention, the partition divides the middle section into a first vertical portion and a second vertical portion such that the feed inlet is in the first vertical portion and the second outlet, for product takeoff, is near the top of the second vertical portion. Within the middle section there is no fluid flow communication between the first vertical portion and the second vertical portion.

In accordance with yet another aspect of the invention, there is provided a process for the fractional distillation of a feed mixture containing a middle boiling fraction, a higher boiling fraction and a lower boiling fraction. The process comprises introducing the feed mixture into a vertically extended distillation column having a first vertically extended zone and a second vertically extended zone wherein the longitudinal axis of the first zone and the second zone are parallel but not necessarily coaxial, wherein the second zone has an upper end and a lower end, wherein the first zone and the second zone are in fluid flow communication only at the lower end of the second zone and wherein the feed mixture is introduced into the first zone at a point between the upper end and the lower end. The process further comprises withdrawing the lower boiling fraction from the top of the first zone; withdrawing the higher boiling fraction from the bottom of the first zone; and withdrawing the middle boiling fraction from the first zone at a point near the top of the upper end of the second zone.

DETAILED DESCRIPTION OF THE INVENTION

Figure 1:
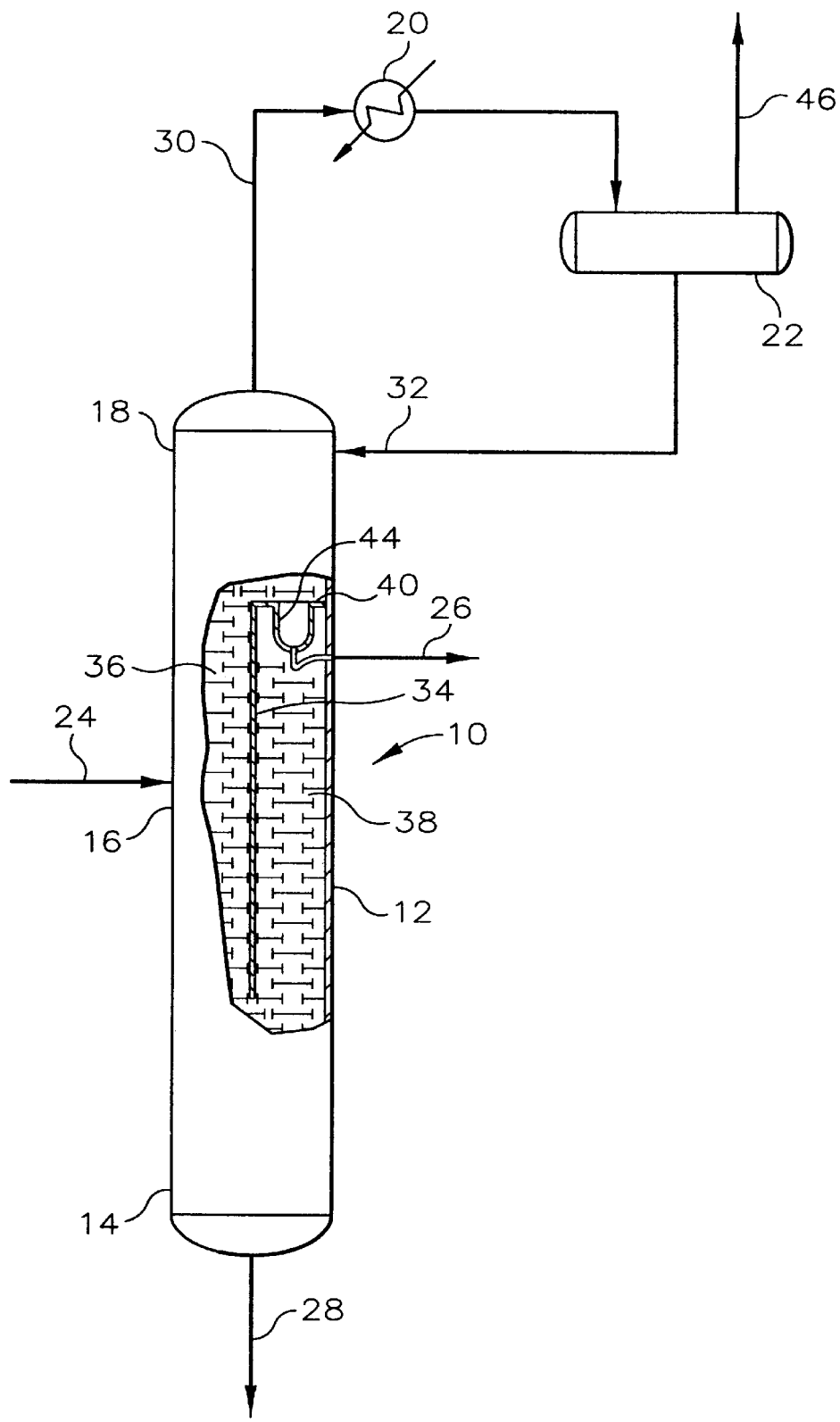
FIG. 1 is a diagrammatic illustration of a distillation column according to the present invention. The distillation column is shown utilizing a condenser/reflux system and the column has a portion broken away in order to illustrate the middle section of the column.

As shown in FIG. 1, there is a distillation apparatus 10 including a rectifying column 12 having a bottom section 14, a middle section 16 and a top section 18. The distillation apparatus 10 also includes condenser or cooling means 20 and accumulator 22.

The rectifying column 12 includes an inlet 24 for the introduction of a feed mixture into the rectifying column, an outlet 26 for the removal of a middle boiling fraction, an outlet 28 for the removal of a higher boiling fraction and an outlet 30 for the removal of a lower boiling fraction. The rectifying column also has an inlet 32 for the reflux of condensate from the vapors which were removed via outlet 30. Additionally, the middle section 16 of rectifying column 12 contains a vertical partition 34 which extends from the top of the middle section 16 to the bottom of middle section 16. Vertical partition 34 divides the middle section of rectifying column 12 into a first vertical portion 36 and a second vertical portion 38. Baffle 40 is located at the top of middle section 16. Baffle 40 is suitable for the collection of the middle boiling fraction to facilitate removal through outlet 26 and for blocking fluid flow communication between second vertical portion 38 and the top section 18 of rectifying column 12. In effect, baffle 40 and vertical partition 34 isolate the second vertical portion 38 of rectifying column 12 such that the second vertical portion 38 can undergo fluid flow communication with the rest of rectifying column 12 only at the bottom of partition 34. Thus, baffle 40 and vertical partition 34 divide the rectifying column into a first vertically extended zone, comprised of top section 18, first vertical portion 36 and bottom section 14, and a second vertically extended zone comprised of second vertical portion 38 with the two zones only having fluid flow communication between bottom section 14 and the bottom of second vertical portion 36.

Figure 2:
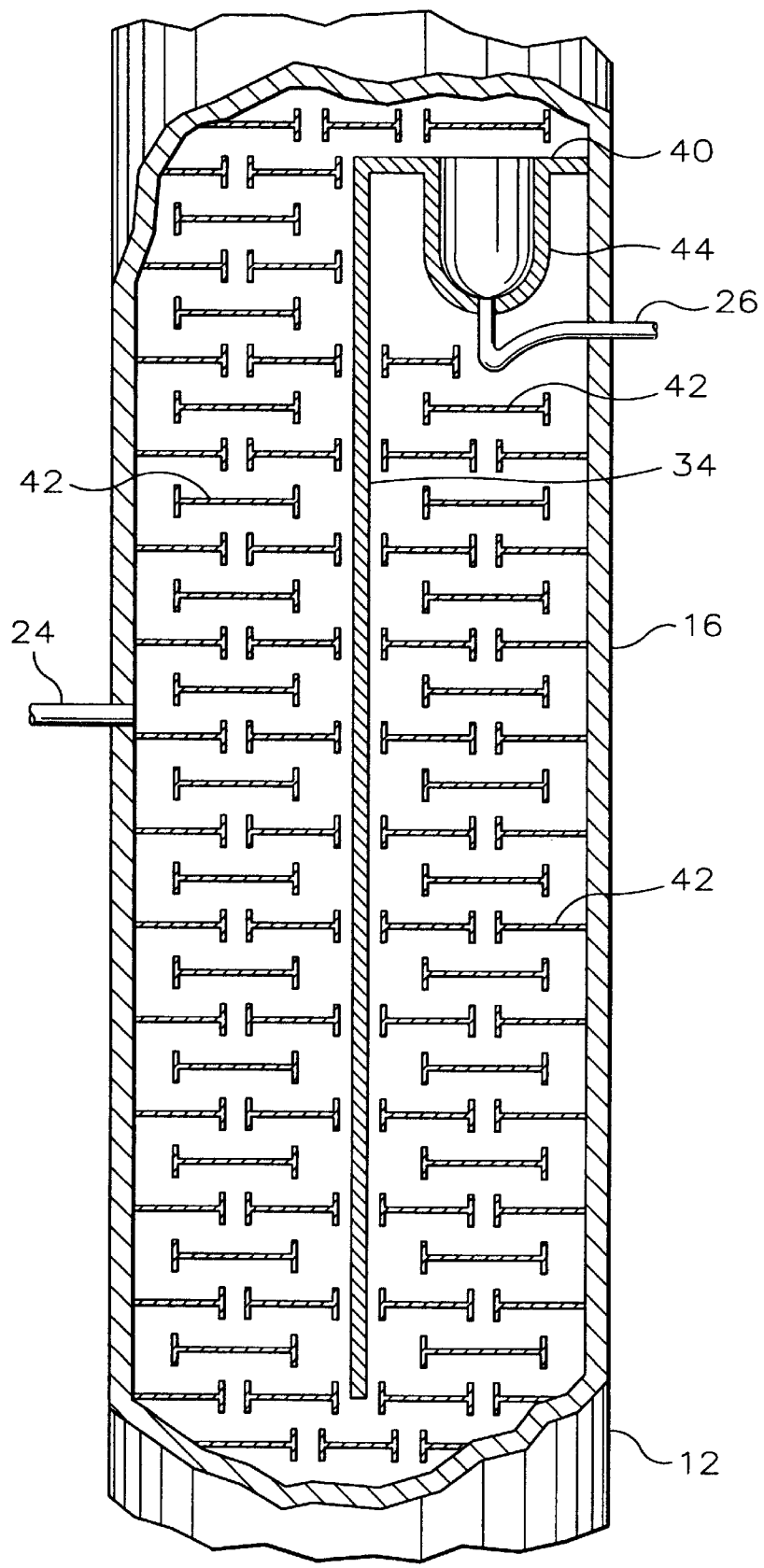
FIG. 2 is an isometric illustration of the middle section of the distillation column of FIG. 1 wherein trays, to encourage rectifying, have been illustrated.

The interior of rectifying column 12 will typically be filled with packing or have a distribution of plates within the column to facilitate rectification and stripping. This packing or distribution of plates serves to baffle countercurrent contact among the middle boiling fraction, the higher boiling fraction and the lower boiling fraction. FIG. 2 illustrates a distribution of plates 42 within the middle section 16 of rectifying column 12. Additionally, from FIG. 2 it can be seen that inlet 24 is preferably vertically positioned at approximately the midpoint of vertical partition 34. Also, baffle 40 has a trough 44 for the collection of the middle boiling fraction. Trough 44 is in fluid flow communication with outlet 26.

In operation, a feed mixture having three components is introduced into rectifying column 12 via conduit 24. The three components should comprise a middle boiling fraction, a higher boiling fraction and a lower boiling fraction wherein the higher boiling fraction has a higher boiling point than the middle boiling fraction and the middle boiling fraction has a higher boiling point than the lower boiling fraction under the conditions within the rectifying column. The pressure and temperature within the rectifying column 12 is such that the lower boiling fraction will tend to vaporize and, hence, move upwardly in the column and a major portion, preferably essentially all, of the higher boiling fraction will remain liquid and, hence, tend to move downwardly in the column.

The lower boiling fraction vapor which collects in the top section 18 of rectifying column 12 is removed via outlet 30 and at least partially condensed in condenser 20 before being introduced into accumulator 22. Within accumulator 22, any remaining vaporous middle boiling fraction entrained in the lower boiling fraction vapor is condensed and separated by settling from the lower boiling fraction vapor. Also, some lower boiling fraction vapor is condensed. Subsequently, the uncondensed vapor is removed from accumulator 22 via outlet 46. The condensed middle boiling fraction and lower boiling fraction is removed from accumulator 22 and reintroduced into rectifying column 12 via inlet 32. The condensed lower boiling fraction and middle boiling fraction will tend to move downwardly in rectifying column 12 with vaporization of the lower boiling fraction occurring. Upon vaporization, the lower boiling fraction will tend to move upwardly within rectifying column 12. Some downwardly moving middle boiling fraction will collect in trough 44 of baffle 40 and be removed from the rectifying column 12 through outlet 26.

The higher boiling fraction will collect in the bottom section 14 of rectifying column 12 and can be removed via outlet 28. Additionally, a portion of the higher boiling fraction will vaporize and move upwardly in rectifying column 12. This higher boiling fraction vapor will condense as it moves upwardly and return to downward movement as a liquid. Vapor from the kettle, consisting of mostly vapor of the middle boiling fraction and higher boiling fraction, is free to rise on both sides of the partition. On the feed side, first vertical portion 36, the vapor can flow up the column past the feed and into top section 18. On the second vertical portion side, upwardly flowing vapor is restricted to only moving up to baffle 40 and hence the second vertical portion becomes a total reflux column. This design promotes kettle boil-up vapor condensation on the outside of baffle 40 and trough 44. The kettle boil-up vapor condensation will heat these parts and tend to drive off any lower boiling fraction component contained within trough 44 prior to it leaving the system via outlet 26. Since the middle boiling fraction boils at a higher temperature than the lower boiling component, the higher temperature on baffle 40 and trough 44 will tend to drive off any lower boiling fraction impurity as vapor but leave the middle boiling fraction as saturated liquid, thus, forcing the lower boiling fraction into the upper region of the column where it can be removed.

Partition 34 and baffle 40 prevent the components of the feed mixture from taking a direct path to outlet 26 and, thus, a higher purity middle boiling fraction stream can be obtained from outlet 26, than could be obtained without partition 34 and baffle 40.

EXAMPLES

The following examples demonstrate that a distillation column according to the invention results in a takeoff stream having a higher purity for the lower boiling fraction and middle boiling fraction than prior distillation columns. The examples utilized a distillation column as described above with a vertical partition and a baffle at the top of the vertical partition. The control runs utilized a similar distillation column but without the vertical partition or baffle. The columns of the control runs and the example runs were filled with 4.0 mm packing from Scientific Development Company. The example runs and control runs described in this report always used a three-component feed comprising equal volumes of cyclopentane ($C_yC_5$), cyclohexane ($C_yC_6$) and normal heptane (n-$C_7$). Table I shows the density and boiling points of the pure materials at standard pressure.

TABLE I

| | Molecular Weight | Normal Boiling Point ° C. | Density g/ml |
|---|---|---|---|
| $C_yC_5$ | 70.15 | 49 | 0.745 |
| $C_yC_6$ | 84.18 | 80 | 0.779 |
| n-$C_7$ | 100.23 | 98 | 0.684 |

Ideally, the feed mixtures would have been introduced into the distillation column with equal volumes of each component, but at times the feed mixture deviated slightly from this objective. Although not selected from a typical plant's operating conditions, equal volumes of each component simplified data interpretation. The amount of product removed from the overhead condenser, sidedraw cup and from the kettle are indicated in Table II.

During operation, the column was maintained at roughly 0.3 to 0.4 psig positive pressure simply to preclude air entering the column and to supply a positive pressure for the pump removing fluid from the kettle. The pressure was maintained by a slight purge of nitrogen. The purge flow did not contact liquid products, and therefore did not impact operation. At each startup, the column was depressurized several times to insure that the column volume contained only hydrocarbons and not nitrogen remaining from shutdown of the previous run.

The column feed temperature was 60° C. Since this temperature was measured inside the feed tube and only about 1 cm from the column wall, the feed temperature data represented the actual condition. These values were selected to vaporize essentially all the low boiling fraction (cyclopentane) but allow all the essentially high boiling fraction (n-heptane) to remain liquid. The middle boiling fraction (cyclohexane) entered the column with a liquid-vapor distribution such that there were significant amounts of the middle boiling fraction in each phase. Visual observations showed the feed to be a two-phase mixture at the column entry point.

For all the runs, the feed rate was held constant at 150 ml/hr. During the run, all flow rates were monitored at least every two hours by timing a measured volume of flow. As can be seen from Table II, the purity for the cyclopentane was increased by use of the inventive apparatus for all three distillation column conditions. Additionally, the purity of the sidedraw, cyclohexane, was greatly increased for the inventive apparatus over a distillation column using a conventional arrangement for the sidedraw.

TABLE II

|  | Control 1 | Example 1 | Control 2 | Example 2 | Control 3 | Example 3 |
|---|---|---|---|---|---|---|
| Takeoff flow at condenser | 50 ml/hr | 50 ml/hr | 50 ml/hr | 50 ml/hr | 50 ml/hr | 50 ml/hr |
| Takeoff flow at side draw | 40 ml/hr | 40 ml/hr | 35 ml/hr | 35 ml/hr | 30 ml/hr | 30 ml/hr |
| Takeoff flow at kettle | 60 ml/hr | 60 ml/hr | 65 ml/hr | 65 ml/hr | 70 ml/hr | 70 ml/hr |
| Condenser $C_yC_5$ purity percent by volume | 94% | 98% | 96% | 99% | 90% | 97% |
| Side draw $C_yC_6$ purity percent by volume | 86% | 92% | 88% | 93% | 74% | 91% |
| Kettle draw percent of n-$C_7$ removed from bottom | 86% | 94% | 95% | 96% | 95% | 97% |

In general, the above examples illustrate that better separation, and, thus, higher purities, for the lower boiling point fraction and middle boiling point fraction can be achieved by utilizing a separation partition according to the current invention.

While this invention has been described in detail for the purpose of illustration, it is not to be construed as limited thereby but is intended to cover all changes and modifications within the spirit and scope thereof.

That which is claimed:

1. An apparatus for the separation of different boiling fractions from a feed mixture containing a middle boiling fraction, a higher boiling fraction and a lower boiling fraction, comprising:

a fractional distillation column having a bottom section, a top section and a middle section and having a first outlet for removing primarily said higher boiling fraction located in said bottom section, a second outlet for removing primarily said middle boiling fraction located in said middle section, a third outlet for removing primarily said lower boiling fraction located in said top section and a feed inlet for introducing said feed mixture into said fractional distillation column located below said second outlet and within said middle section, said fractional distillation column containing a partition extending vertically from the top of said middle section to the bottom of said middle section and having an upper end and a lower end and wherein said partition divides said middle section into a first vertical portion and a second vertical portion such that said feed inlet is in said first vertical portion and said second outlet is near the top of said second vertical portion and, within said middle section, there is no fluid flow communication between said first vertical portion and said second vertical portion; said fractional distillation column further containing a baffle at said upper end of said second vertical portion which allows said middle boiling fraction from said first vertical portion to be removed by said second outlet but prevents fluid flow communication between said first vertical portion and said second vertical portion at said upper end of said portion so that fluid flow communication between said first vertical portion and said second vertical portion occurs at said lower end of said partition and said baffle prevents fluid flow communication between said second vertical portion and said top section and between said second vertical portion and said second outlet.

2. An apparatus according to claim 1 further comprising a vertical series of trays spaced throughout said middle section such as to baffle countercurrent contact among said middle boiling fraction, said higher boiling fraction and said lower boiling fraction of said feed mixture.

3. An apparatus according to claim 1 further comprising packing throughout said middle section such as to baffle countercurrent contact among said middle boiling fraction, said higher boiling fraction and said lower boiling fraction of said feed mixture.

4. A process for separation of a feed mixture containing a middle boiling fraction, a higher boiling fraction and a lower boiling fraction, comprising:

introducing said feed mixture into a vertically extended fractional distillation column having a bottom zone, a top zone and a middle zone; providing in said fractional distillation column a partition extending vertically from the top of said middle zone to the bottom of said middle zone and having an upper end and lower end wherein said partition divides said middle zone into a first vertical zone and a second vertical zone; providing in said fractional distillation column further a baffle having an upper side and a lower side and located at said upper end of said partition with said lower side being in said second vertical zone for preventing fluid flow communication between said first vertical zone and said second vertical zone at said upper end of said partition so that fluid flow communication between said first vertical zone and said second vertical zone occurs at said lower end of said partition and said baffle for preventing further fluid flow communication between said second vertical zone and said top zone, wherein when said feed mixture is introduced into said distillation column it is introduced into said first vertical zone;

maintaining the feed mixture in said vertically extended fractional distillation column under conditions sufficient to separate said higher boiling fraction, said middle boiling fraction and said lower boiling fraction;

withdrawing said lower boiling fraction from said top zone;

collecting said middle boiling fraction on said upper side of the baffle: and withdrawing said higher boiling fraction from said bottom zone;

withdrawing said middle boiling fraction.

* * * * *